Figure 1:
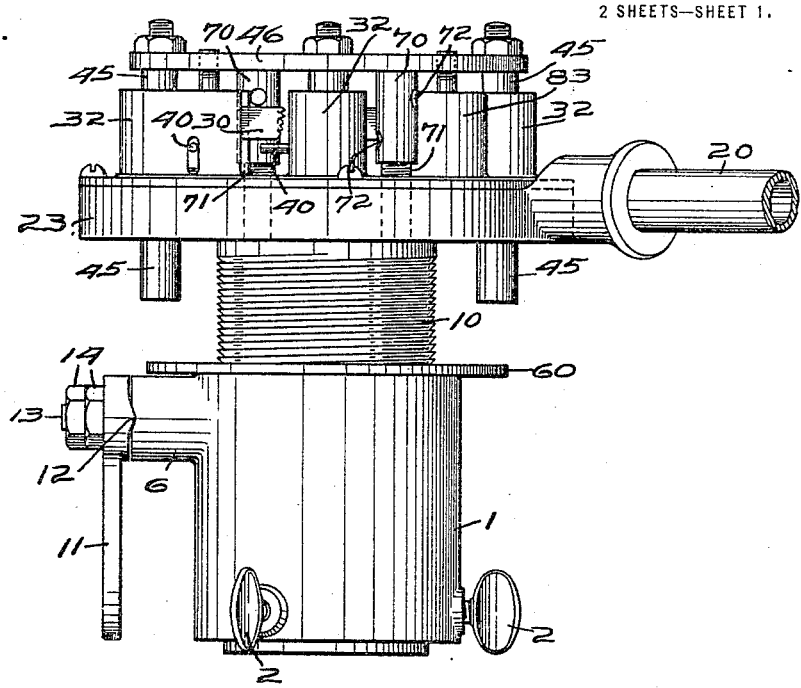

T. H. FIELD.
PIPE DIE.
APPLICATION FILED JUNE 20, 1916.

1,235,303.

Patented July 31, 1917.

2 SHEETS—SHEET 1.

INVENTOR.
Thomas H. Field
by
Owen Owen & Crampton

T. H. FIELD.
PIPE DIE.
APPLICATION FILED JUNE 20, 1916.

1,235,303.

Patented July 31, 1917.
2 SHEETS—SHEET 2.

INVENTOR.
Thomas H. Field
by
Owen, Owen &

UNITED STATES PATENT OFFICE.

THOMAS H. FIELD, OF ARCHBOLD, OHIO.

PIPE-DIE.

1,235,303.  Specification of Letters Patent.  Patented July 31, 1917.

Application filed June 20, 1916. Serial No. 104,813.

*To all whom it may concern:*

Be it known that I, THOMAS H. FIELD, a citizen of the United States, and a resident of Archbold, in the county of Fulton and State of Ohio, have invented a certain new and useful Pipe-Die; and I do hereby declare the following to be a full, clear, and exact description of the invention, such as will enable others skilled in the art to which it appertains to make and use the same, reference being had to the accompanying drawings, and the characters of reference marked thereon, which form a part of this specification.

My invention relates to pipe dies and it relates to means for causing the dies to cut tapering threaded portions on the ends of pipes for close fitting and tight connecting of pipes together. It particularly relates to the means permitting the dies to gradually recede from the pipe. It also relates to means for cutting standard sizes on the end of the pipe and of uniform diameter.

The construction containing the invention may be modified by those skilled in the art. I have shown in the drawing accompanying this specification a structure which contains the invention, and which, however, may be greatly modified in its details and in the substitution of elements having functions equivalent to those illustrated and described hereinafter.

Figure 2:
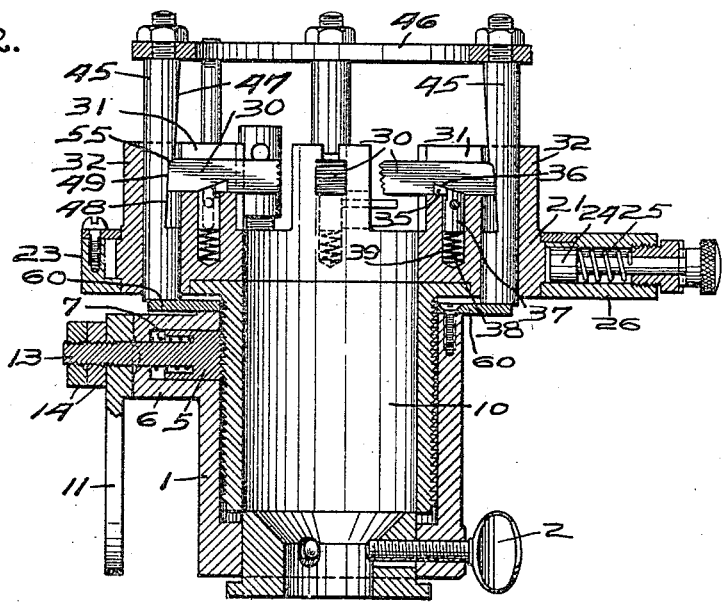
Figure 3:
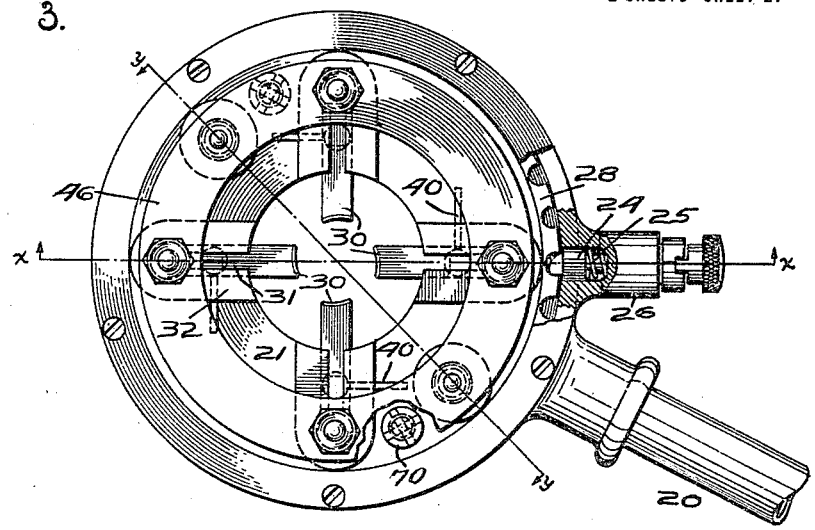
Figure 4:
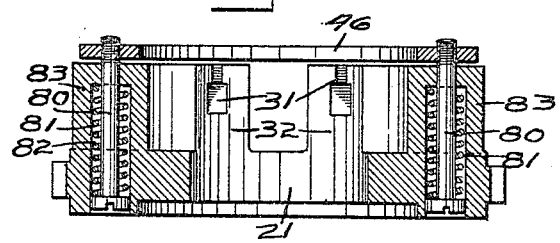

Referring to the drawings, Figure 1 is a side elevation view of the pipe die. Fig. 2 is a sectional view of the pipe die taken on the line $x$—$x$ indicated in Fig. 3, wherein is shown a top view of the pipe die. Fig. 4 is a sectional view of the head of the pipe die cutting machine taken on the line $y$—$y$ indicated in Fig. 3.

1, Fig. 1, is the chuck which is connected to the end of the pipe by means of the thumb screws 2. The chuck 1 is provided with a threaded engaging member 5 having threads extending transverse its engaging face. It is located in a boss 6 which is formed on the chuck 1. It is spring-pressed by means of the spring 7 so as to be pressed into engaging relation with respect to the feed screw 10 when released by the lever 11 which is provided with cam parts 12. The outer end of the boss 6 is also provided with a coacting cam surface so that when the lever 11 is turned about the pin 13 which is connected to the engaging member 5 it will pull the engaging member 5 from the feed screw 10 and into the boss 6 and against the pressure of the spring 7. A pair of lock nuts 14 are threaded on to the stem 13 to hold the lever 11 in position and yet permit rotation movements of the lever 11 to withdraw the engaging member 5 from the feed screw 10 and to permit engagement therewith when turned back, or so as to permit the cam parts to mesh.

The feed screw 10 extends into the chuck 1 and is rotated by means of a suitable arm 20 which is connected to the head 21 of the pipe die cutting machine to which the feed screw 10 is also connected. As the head 21 and the feed screw are turned by movement of the lever 20 the feed screw 10 moves rotatably and longitudinally into the chuck 1 by reason of the threaded engagement with the threaded engaging member 5. If desired, the arm 29 may be connected to a ring 23 which may be connected to the head 21 by means of a dog 24, which is spring-pressed by the spring 25. They are located in a boss or neck 26 formed on the ring 23. The head 21 is provided with teeth 28 with which the dog 24 engages, so that the lever 20 may be moved back and forth, and when moved in one direction the dog 24 rides over the teeth 28, but when moved in the opposite direction it engages the teeth 28 and thus causes movement of the head 21 by means of the lever 20.

Dies 30 are located in cuts 31 formed in posts 32. The posts 32 are located on and form a part of the head 21. The dies 30 are guided in their longitudinal movements by the cuts 31 formed in the posts 32. The dies 30 are provided with notches 35 having inclined surfaces 36 which slope rearwardly with respect to each of the dies. Beneath each die is located a dog 37 which is spring-pressed by the spring 38. It is, in each case, located in a hole 39 bored into the post 32 in which the die is located. The dogs are also provided with transverse pins 40 which may, if desired, be pressed downward in order to readily remove the die by drawing the die inward with respect to the head 21. The upper ends of the dogs 37 are also inclined and press against the inclined surfaces 36 of the dies 30 and thus tend to press the dies 30 rearwardly with respect to the dies, or outwardly with respect to the head 21.

To the rear of the dies 30 are provided die guides 45 which are secured together by means of a ring 46. The die guides 45 are provided with two inclined surfaces 47 and 48, while the rear end of each die is also provided with a surface 49 which has the same angle of inclination to the axis of the die cutting machine that the die surfaces 47 and 48 of the posts 45 have. The dies 30 abut against the posts 45 and are pressed thereagainst by the dogs 37. The rear ends of the dies 30 having an inclination the same as that of the surfaces 47 and 48 of the posts 45, the dies abut squarely against the inclined surfaces of the posts. The upper rear corners of the dies 30 are rounded, while the surfaces 47 and 48 are arranged in stepped relation, and rounded shoulders or steps 55 are located intermediate the surfaces 47 and 48, which approximates the shape of and fits over the rounded corners of the dies. While the dies are cutting the thread on the pipe they are pressed outward, not only by the dogs 37 against the surfaces 47, but they are pressed with a greater pressure by the work which is being cut by the dies against the surfaces 47 and in the process when the work is completed the dies 30 slip under the shoulders 55, which releases them entirely from the work. The pressure of the dogs 37 against the inclined surfaces 36 of the dies is sufficient to releasably hold the die guides 45 and their connecting ring 46 in the die-open position. On the other hand, by a smart blow of the hand or considerable additional pressure in the direction of the die guides, the dies 30 will release the die guides and permit them to reënter or pass through the head 21.

In order to properly regulate the movement of the die guides 45 they extend through the head 21 so as to engage with the chuck 1 and as the head 21 is turned, which causes the feed screw 10 to move into the chuck 1 and consequently causes the head 21 to move toward the chuck 1. As the thread is cut on the pipe, the die guides 45 are forced outward from the head 21, provided the head 21 is so placed that the ends of the die guides 45 press against the chuck 1.

In the form of the invention shown I have provided a flange 60 which may be readily lubricated, and in starting the work to form a tapered threaded portion on the end of the pipe the die guides 45 are pushed into the head 23 and so that the die guides 45 extend well through the head 21. The feed screw 10 and the head 21 are so placed relative to the chuck 1 that the ends of the die guides 45 are located in proximity to the flange 60. They may be located so as to just touch the flange 60 or so that the flange 60 will push the die guides 45 a short distance through the head 21. This will be dependent upon the width of the tapered portion which it is desired to cut on the end of the pipe or on its location relative to the end of the pipe. If it is desired a portion of the pipe may be cut cylindrically and then when the ends of the die guides 45 reach the flange 60 the dies will begin to cut a tapered portion on the pipe. As the feed screw 10 is drawn into the chuck 1 by the operation of the engaging member 5 the die guides 45 will be pushed outward through the head 21 by means of the flange 60. The surfaces 47 will allow the dies 30 to gradually recede from the work until the ends of the dies slip underneath the shoulders 55, whereupon the dies will be released from the work. They will then be in die-open position. This will be detected by the free and easy movement of the lever 20.

Means is also provided for cutting standard sizes or to start the threaded tapering portions at standard sizes. This is accomplished by the threaded posts 70 which are threaded on to the posts 71 secured to the head 21. The posts 70 are provided with holes 72 into which a tool may be inserted to rotate the posts 70 to cause them to be lifted by reason of their threaded connection to the posts 71. The posts 70 are located intermediate the hub 21 and the ring 46, and when they are rotated on the posts 71 they lift the ring 46 a distance proportionate to the number of times that the posts 70 are turned on the posts 71, and in so doing they cause the die guides 45 to permit the dies 30 to be pushed outward by the dogs 37 also a definite distance and proportionate to the number of times the posts 70 are rotated on the posts 71. By this means any definite diameter may be given to the cut portions of the end of the pipe. If the head 21 and the feed screw 10 are located with respect to the chuck so that the ends of the die guides 45 are remote from the flange 60 they will cut a cylindrical end having the definite diameter, which is determined by the position of the die guides 45, which is set by the posts 70 and 71. If, on the other hand, the ends of the die guides 45 just touch the flange 60 located on the chuck 1, the pipe will immediately begin to cut a tapered end which will have its outermost end a definite diameter, which likewise is determined by the ring 46, which is set by the posts 71.

The head 21 is provided with bosses 83 in which are located rods 80 that are secured to the ring 46. Springs 81 are located in recesses 83, and intermediate the heads of the rods 80 and the ends of the recesses 82 which operate to yieldingly draw the ring 46 toward the head 21. The die guides 45 being secured to the ring 46, the springs 81 operate to draw the die guides into the head 21 and to keep the ends of the die guides 45 against the flange 60 of the chuck.

Having thus described my invention, what

I claim as new, and desire to secure by Letters Patent, is—

1. In a die cutting machine, the combination of a head and a chuck, a plurality of die guides supported in the head and movable with and in the head, a plurality of dies guided by the guides and abutting the chuck, the ends of the die guides extending through the head and slidable on the chuck as the head is rotated, and a feed screw for pressing the die guides against the chuck and through the head to move the dies.

2. In a die cutting machine, the combination of a head, a plurality of dies, a plurality of die guides for guiding the dies and movable through the head, a ring secured to the die guides, a threaded member located on the head and intermediate the ring and the head for setting the die guides relative to the dies, a spring-pressed means for yieldingly holding the ring against the threaded member, a chuck, a feed screw for pressing the ends of the die guides against the chuck to permit the dies to recede from their adjusted positions relative to the work.

3. In a die cutting machine, the combination of a plurality of dies, a head, a plurality of die guides extending through the head, a chuck having a flange, means for forcing the die guides against the flange of the chuck, a feed screw for moving the die guides through the head.

4. In a die cutting machine, the combination of a head, a plurality of dies, a plurality of die guides located in the head, a ring for connecting the die guides, a chuck, a feed screw for moving the head relative to the chuck, means for yieldingly pressing the die guides against the chuck, the chuck operating to move the die guides relative to the head.

In testimony whereof, I have hereunto signed my name to this specification.

THOMAS H. FIELD.

Copies of this patent may be obtained for five cents each, by addressing the "Commissioner of Patents, Washington, D. C."